United States Patent [19]

Korpman

[11] 4,294,936
[45] Oct. 13, 1981

[54] ADHESIVE COMPOSITIONS

[75] Inventor: Ralf Korpman, Bridgewater, N.J.

[73] Assignee: Permacel, New Brunswick, N.J.

[21] Appl. No.: 142,691

[22] Filed: May 5, 1980

Related U.S. Application Data

[63] Continuation-in-part of Ser. No. 54,541, Jul. 5, 1979, abandoned.

[51] Int. Cl.³ .................................................. C08L 9/06
[52] U.S. Cl. ........................................ 525/93; 260/26; 427/208.4; 428/355
[58] Field of Search .................... 260/26; 525/93; 427/208.4; 428/355

[56] References Cited

U.S. PATENT DOCUMENTS

| | | | |
|---|---|---|---|
| 3,644,267 | 2/1972 | Jackson et al. | 260/33.6 |
| 3,658,740 | 4/1972 | Marrs et al. | 260/27 |
| 3,676,202 | 7/1972 | Korpman | 260/26 |
| 3,784,587 | 1/1974 | Chambers | 260/876 |
| 3,850,858 | 11/1974 | Park | 260/27 |
| 3,909,333 | 9/1975 | Eastman | 260/26 |
| 3,954,692 | 5/1976 | Downey | 260/33.6 AQ |
| 3,959,062 | 5/1976 | Hoh et al. | 260/26 |
| 3,969,294 | 7/1976 | Papouchado | 260/26 |
| 4,046,838 | 9/1977 | Feeney | 260/876 |
| 4,048,128 | 9/1977 | Eastman | 260/22 |
| 4,080,348 | 3/1978 | Korpman | 260/27 BB |
| 4,102,835 | 7/1978 | Freeman et al. | 260/27 |
| 4,119,607 | 10/1978 | Gergen | 525/93 |
| 4,136,071 | 1/1979 | Korpman | 260/27 BB |

*Primary Examiner*—V. P. Hoke
*Attorney, Agent, or Firm*—Alice O. Robertson

[57] ABSTRACT

Pressure-sensitive adhesive compositions having solvent resistant properties comprising (a) a synthetic rubbery thermoplastic block-copolymer, (b) a polyester and (c) a tackifier resin.

10 Claims, No Drawings

ADHESIVE COMPOSITIONS

This application is a continuation-in-part of my copending application, Ser. No. 54,541, filed July 5, 1979 now abandoned.

This invention relates to improved adhesive compositions, more particularly, to pressure-sensitive adhesive compositions suitable for use in adhesive tapes.

BACKGROUND OF THE INVENTION

Normally tacky pressure-sensitive adhesives suitable for use in adhesive tapes must have a good balance of adhesion, cohesion, stretchiness, and elasticity. A high degree of tackiness is desired to provide for ready bonding and high cohesive strength is desired to facilitate clean removal from surfaces onto which the tape has been applied. The adhesives are generally based on film forming elastomeric materials, such as SBR rubber polychloroprene, polybutadiene, acrylate, natural rubber, etc. More recently, synthetic rubber based on block copolymers, generally known as A-B-A or A-B block copolymers, have been employed as the elastomeric base. These together with a liquid or solid tackifier resin or mixture of resins and further with minor amounts of other materials such as fillers, antioxidants and release agents provide a pressure-sensitive adhesive composition suitable for use as tape adhesive. A frequent use for pressure-sensitive adhesives is in masking tape or in other industrial tapes where the product may be exposed to high solvent atmosphere. Representative of exposure to high concentration to solvents is seen when masking tape is used during spray painting with oil based coatings in the automobile and aircraft industry. In such applications where there is exposure to organic solvents, many of the pressure-sensitive adhesives have been found to be deficient in that the adhesive is susceptible to dissolution in an organic solvent at the exposed edges and thus not providing clean and complete protection. Solvent resistant pressure-sensitive tapes have heretofore been made normally by cross-linking solvent coated tapes. There are no generally known methods to produce solvent resistant pressure-sensitive adhesive using a solventless approach, e.g., hot melt coating or extrusion.

DESCRIPTION OF THE INVENTION

According to the present invention, there is provided pressure-sensitive adhesives which have a superior balance of properties suitable for pressure-sensitive adhesive tapes and further are substantially resistant to attack by organic solvents. The pressure-sensitive adhesive composition of the present invention comprises a blend of a synthetic rubber block copolymer component, a non-rubber component and a tackifier component. More specifically the pressure-sensitive composition comprises a blend of (a) a synthetic rubbery thermoplastic block copolymer, e.g., an A-B-A or A-B block copolymer or a mixture thereof, (b) a non-rubbery polymer which is preferably a copolyester, e.g., one of at least two different ester units, and (c) a tackifier resin, wherein in the composition the non-rubbery polymer is present in an amount of from about 5 to about 50 parts by weight for every 100 parts of block copolymer and the tackifier resin is present in an amount of from about 20 to 150 parts by weight for every 100 parts by weight of the block copolymer. The thermoplastic rubbery A-B-A or A-B block copolymers are those having thermoplastic blocks conventionally designated as A blocks and rubbery blocks conventionally designated as B blocks and may be linear, branched or radial. The radial block copolymers may be designated (A-B)$_n$X wherein X is a polyfunctional atom or molecule and in which each (A-B)— radiates from X in a way that A is an endblock. A-B block copolymer, sometimes referred to as "simple" block copolymer, are those in which B forms one endblock rather than a midblock. The thermoplastic "A" block is generally a polymer of alkenylarenes, preferably of styrene but may be of styrene homologs and analogs such as $\alpha$-methylstyrene, 5-tertiary-butylstyrene, 4-methylstyrene, 3,5-diethylstyrene, 3,5-di-n-butylstyrene, 4-(4-phenyl-n-butyl)styrene, 2-ethyl-4-benzylstyrene, 4-cyclohexylstyrene, 4-n-propylstyrene vinyltoluene and the like.

The rubbery "B" block is a polymer of a conjugated lower aliphatic diene of from 4 to about 6 carbon atoms such as butadiene, isoprene, 1,3-pentadiene, 1,3-hexadiene, 2,3-dimethylbutadiene and the like. The preferred diene is isoprene. In the radial block copolymer, (A-B)$_n$X, X may be an organic or inorganic polyfunctional atom or molecule and n is an integer having the same value as the functional group originally present in X. It is usually at least 3 and is frequently 4 or 5 but is not limited thereto and may be a more complex system such as disclosed in the article, "New Rubber is Backed by Stars," appearing in Chemical Week, June 11, 1975, page 35.

Suitable thermoplastic rubber block copolymers are prepared by stepwise solution polymerization of the components. The preparations and properties of block copolymers are amply described in the literature such as, for example, "Thermoplastic Rubber (A-B-A Block Copolymers) in Adhesives" by J. T. Harlan et al., in "Handbook of Adhesives" edited by Irving Skeist, Van Nostrand Reinhold Co., New York, Second Edition (1977), pages 304–330; "Rubber-Related Polymers, I. Thermoplastic Elastomers" by W. R. Hendricks et al., in "Rubber Technology" edited by Maurice Morton, Van Nostrand Reinhold Co., New York (1973), pages 515–533; and U.S. Pat. Nos. 3,321,635; 3,519,585; 3,787531; and 3,281,383; and for A-B block copolymers, U.S. Pat. Nos. 3,519,585 and 3,787,531.

In the suitable block copolymers, the individual "A" block portion has a number average molecular weight of at least 6,000, preferably in the range of from about 8,000 to 30,000, and the "B" block portion has a number average molecular weight preferably in the range of from about 45,000 to about 180,000. The "A" blocks constitute from about 5 to about 50 percent, preferably about 10 to about 30 percent by weight of the block copolymer. The number average molecular weight of the block copolymer is preferably in the range of about 75,000 to 200,000 for linear copolymers and preferably in the range of about 125,000 to 400,000 for radial copolymers.

When the "A" block is a styrene polymer and the "B" block is an isoprene polymer, the copolymer is frequently referred to as S-I-S polymer, or S-I polymer. Similarly, S-B-S refers to a styrene-butadiene-styrene copolymer. Many of the block copolymers are obtainable commercially under trade names such as Kraton ® 1102 (SBS), Kraton ® 1107 (S-I-S) products of Shell Chemical Company, and Solprene ® 311 (S-I), product of Phillips Petroleum Company.

The non-rubbery component is preferably a copolyester although polyethylene and polypropylene may be employed. A suitable copolyester is a polymer of at least two identifiable ester units, which may be represented by the formulas

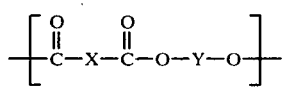

and

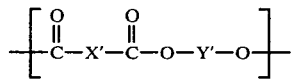

wherein X and X' are nuclei of dicarboxylic acids and Y and Y' are nuclei of aliphatic diols, and wherein in the copolyester polymer, the ester units are present in such amounts as to confer to the polymer the desirable physical properties hereinafter enumerated. The different ester units may arise from the condensation of (a) two different acids with the same diol, (b) two different diols with the same acid, or, (c) two different acids and two different diols. In the latter case, four different ester units would be possible. By "copolyesters" is meant to include random and segmented copolyesters. By "random" is meant that the ester units are not usually in a definite pattern such as in alternating units or in having a homopolymer of one ester unit joined terminally to a homopolymer of a second ester unit. By "segmented" is meant that there is a polymer block of a given ester unit joined to a polymer block of another ester unit through an ester linkage. The chemical nature of the acid and diol component is not critical per se provided that the esters exhibit the softening and torque properties hereinafter described. Thus, numerous dicarboxylic acid and diol combinations may be employed. Among the aromatic and aliphatic dicarboxylic acids suitable in the copolyester are terephthalic acid, isophthalic acid, oxalic acid, maleic acid, succinic acid, glutaric acid, adipic acid, suberic acid, azelaic acid, sebacic acid, and the like. When both aliphatic and aromatic dicarboxylic acids are components, the ester of the aliphatic acid should constitute the major portion. The aliphatic diols useful in the polyester include ethylene glycol, 1,3-propylene glycol, diethylene glycol, dipropylene glycol, butylene glycol, tetramethylene glycol, trimethylene glycol and the like. Preferred aliphatic diols are straight chain alkylene diols having from 2 to 4 carbon atoms. Representative copolyesters may be mentioned the following limited by appropriate torque properties: poly(ethylene terephthalate-co-ethylene azelate), poly(ethylene terephthalate-co-butylene adipate), poly(butylene terephthalate-co-butylene isophthalate), poly(ethylene terephthalate-co-ethylene sebacate), poly(ethylene terephthalate-co-ethylene adipate), and the like, including polyesters described on pages 77–80 of "Encyclopedia of Polymer Science and Technology," Vol. 11, John Wiley and Sons (1977).

Random copolyesters are frequently identified in the literature not according to ester units but according to the relative amounts of the components of the ester. Thus, for example, in U.S. Pat. No. 3,699,189, there is found described copolyesters in which the component acids are terephthalic acid and sebacic acid, and the component diols are ethylene glycol and neopentyl glycol, which are said to be esters in which the terephthalic acid units can range from 20 to 75 percent and the sebacic acid units can range from 80 to 25 percent of the total acid units, and the ethylene glycol units can range from 40 to 60 percent and neopentyl glycol units can range from 60 to 40 percent of the total diol units. Within the foregoing scope of polyesters may be found those having the desired torque properties. A number of suitable copolyesters are available commercially under VPE designations from Goodyear Tire & Rubber Company and under KODAR ® designations from Eastman Chemical Company.

Suitable copolyesters may be made by conventional condensation polymerization procedures employing appropriate modification depending on the ultimate product desired. One general method is direct esterification employing dicarboxylic acids or conventional acid derivatives such as esters, halides, etc., with diols usually at high temperatures and long reaction times. The temperature is usually in the range of about 150° to 250° C., but sometimes as high as 280° C. at which temperatures reaction occurs with formation of the ester polymer. The reaction is usually carried out with excess diol to compensate for the loss of diol which is removed by distillation with the liberated water. Conventional catalysts may be employed, if desired.

An alternative method is ester interchange, either alcoholysis or acidolysis, employing diols with dicarboxylic acid diesters or employing diol diesters with dicarboxylic acids. Preferably, an alcoholysis is employed which may be carried out by heating together a dicarboxylic acid diester with excess diol usually with a basic catalyst in an inert atmosphere until evolution of alcohol is complete.

These and other methods of syntheses can be found in the Encyclopedia of Polymer Science and Technology, Vol. 11, pages 88–113.

For segmented copolyesters a stepwise application of the general methods may be employed. Segmented copolyesters are conventionally prepared by an ester interchange reaction. In one procedure, a low molecular weight alkyl diester of one or more dicarboxylic acid is heated with an appropriate long chain and excess short chain diol in the presence of catalyst at about 150° to 200° C. with the distillation of the low molecular weight alcohol formed in the interchange. Heating is continued until the alcohol evolution is complete to obtain a very low molecular weight prepolymer which can be converted to high molecular weight segmented copolyester by heating the prepolymer with a long chain diol and distilling off excess short chain diol preferably at reduced pressures and elevated temperatures in the presence of antioxidants. Preparations particularly suitable for segmented copolyesters may be found in U.S. Pat. Nos. 3,832,314 and 3,932,326.

The copolyesters which are useful in the novel alloy compositions normally possess a thermal softening temperature below about 225° C. (437° F.). The preferred copolyesters have an extrusion temperature within the range from about 325° to about 425° F. Suitable polyesters may be characterized by a torque property which can be measured by working in a recording torque dynamometer (Plasti-Corder ® EPL-V750 manufactured by C. W. Brabender Co., Hackensack, N.J.). When worked at 75 r.p.m. at 420° F. using a REE 6 mixing head, suitable polyesters have a torque value of less than about 600 meter grams. The preferred polyesters exhibited a torque value in the range of from about 100 to about 300 meter grams at this temperature. These values may be converted to poises by employing the following formula $$\frac{\text{torque} \times 388}{\text{r.p.m.}} = \text{poise}$$

Thus, when expressed in poises, the esters should show torque properties of less than about 3,100 poises, preferably about 500 to 1,700 poises. Generally the copolyesters having the foregoing suitable properties have an average number molecular weight in the range of about 20,000 to 200,000, preferably about 30,000 to 75,000.

The tackifying resins which may be employed in the adhesive composition are represented by rosin, dehydrogenated rosin, rosin plus polyterpene resins, glycerol esters of hydrogenated rosins, pentaerythritol esters of hydrogenated rosin, coumarone-indene resins, hydrogenated rosin, glycerol esters of polymerized rosin, maleic anhydride-modified rosin and rosin derivatives, partial esters of styrene-maleic acid copolymers, chlorinated biphenols, oil soluble phenol-formaldehyde resins, and the like.

The adhesive of the present invention may be prepared by melting and mixing together the components and thereafter coating on to a flexible backing for pressure-sensitive sheets or tapes.

For the preparation and for obtaining a tape of desired properties, it is critical and essential that the adhesive composition exhibit certain torque characteristics which conveniently may be measured in the manner described for the copolyester. Thus, even though the non-rubbery component may have marginal physical properties, the ultimate adhesive composition may demonstrate desired properties by the appropriate modification of the rubber and tackifier components. The composition should have a torque value in the range of from 100 to 600 meter-grams when determined at 75 r.p.m. at 420° F. as previously described.

In carrying out the process, several mixing methods may be employed. Since the block copolymer and the copolyesters are generally particulate, one method comprises blending and melting the materials together with a solid tackifier to a homogeneous composition in an extruder and directly coating onto a suitable backing. In other methods, the mixing and coating are carried out as separate steps. The mixing steps may be carried out by adding a solid and/or liquid tackifier to a heated kettle and thereafter adding with stirring the block copolymer and non-rubbery polymer. The adhesive may be coated on to a backing sheet employing conventional hot melt coating procedures. Thus, the adhesive composition may be pumped through a hot die and a backing sheet drawn across or past the die orifice to coat the sheet. Alternatively the adhesive composition may be hot-roll coated or knife coated.

The adhesives prepared as above-described may be applied to paper, metal foils, polyolefin films, polyvinyl chloride films, woven fabrics, non-woven fabrics, or to thermoplastic-elastomeric films of various types such as films of A-B-A block copolymers blended with other polymers such as vinylarenes, copolyesters, and the like.

The following examples illustrate the invention but are not to be construed as limiting:

EXAMPLE I

In separate operations, adhesive compositions having the components listed in Table A

TABLE A

| Components | I | II | III | Control |
|---|---|---|---|---|
| | (parts by weight) | | | |
| S-I-S block copolymer* | 100 | 100 | 100 | 100 |
| Poly(ethylene terephthalate co-ethylene azelate)** | 25 | 30 | 45 | — |
| Polymerized piperylene isoprene solid tackifier*** | 70 | 70 | 70 | 70 |
| Zinc dibutyl dithiocarbamate (antioxidant) | 2 | 2 | 2 | |
| 2,5-ditertiary-amylhydroquinone | 1 | 1 | 1 | 1 |

*Kraton® 1107, Shell Chemical Company
**As a composition having a number average molecular weight of about 21,000, obtainable as VPE 5571 from Goodyear Tire and Rubber Co.
***Softening point, 95° C., obtainable as Wingtack® 95, Goodyear Tire & Rubber Co.

are prepared by blending together in an extruder at about 375° F. and extrusion coating the blends onto a surface of a 27 pound crepe kraft paper previously impregnated with commercial butadiene/acrylonitrile (7/30) copolymer latex (Hycar 1562, B. F. Goodrich Company), and previously coated on the back (opposite) face with a backsize composition. The backsize composition is prepared by solution polymerization of stearyl methacrylate and acrylonitrile in the presence of azo-bis-isobutyronitrile and diluted to a 2 percent solids composition as more fully described in Example III of U.S. Pat. No. 3,502,497. The coated sheets (coating weight approx. 1.5 oz./sq.yd.) are allowed to dry, cut into two tapes of 1 inch width and tested for adhesive strength tack, adhesion (peel rate), and solvent resistance.

The methods employed are as follows: Adhesive strength or adhesion to steel is measured by peeling the tape over itself at 180° at a constant speed by a force applied to the free end of the tape as more fully described in the "Peel Adhesion Test" PSTC-1 of the Pressure-Sensitive Tape Council. Tack is measured by a Quickstick test in which a plastic ping-pong ball is rolled down an incline on to a length of tape at the foot of the incline with the adhesive side up. The vertical height on which the ball starts and the distance the ball rolls along the tape before coming to rest is measured. Quickstick is reported as the height in inches raised to the 3½ power divided by the distance and rolled in inches, as more fully described in U.S. Pat. No. 4,136,071. Peel rate is determined as described in U.S. Pat. No. 3,625,752. Briefly, it is measured by applying a strip of 1 inch tape to a mirror-smooth surface of a photographic chrome ferro-type applied with the tapes parallel to the edge of the plate and with the tapes extending beyond the lower edge of the panel. The test panel is placed in a holder which supports the panel at an angle of 20° from the vertical position so that the tape is capable of being stripped from the panel at a 20° angle when weights are applied to the tapes extending beyond the lower edge. The test panel is placed in a constant temperature room held at 25° C. and a 1,000 gram weight is attached to each tape end. The distance of the tape stripped and the time taken are determined and the rate of stripping calculated by dividing the distance by the time. A rate of stripping showing a value of zero means no movement and is an indication of very good adhesion. The Solvent Resistance test is carried out by placing strips of tape with the adhesive on a clean surface side exposed, and a drop of toluene placed on the surface, and the time measured for the drop to disappear. Greater solvent resistance is directly related to a shorter time before disappearance of the drop. The results are seen in Table AA.

TABLE AA

| Test | COMPOSITION | | | |
|---|---|---|---|---|
| | I | II | III | IV |
| Adhesion to steel (oz./in.) | 48 | 50 | 42 | 48 |
| Tack Ping-Pong Ball Quickstick value | 2.9 | 2.2 | 1.8 | 2.7 |
| Peel Rate (mm./min.) | 0 | 0 | 0 | 0 |
| Solvent Resistance (secs.) | 420 | 105 | 90 | 510 |

EXAMPLE II

In operations carried out in a manner similar to that described in Example I, compositions set forth in Table B

TABLE B

| Components | COMPOSITION | |
|---|---|---|
| | IV | Control |
| | (parts by weight) | |
| S-B-S block copolymer* | 100 | 100 |
| Poly(ethylene terephthalate co-ethylene azelate)** | 40 | — |
| Polymerized mixed olefin soild tackifier*** | 60 | 60 |
| Zinc dibutyl di-thiocarbamate | 2 | 2 |
| 2,5-di-tertiary-amylhydroquinone | 1 | 1 |

*Kraton® 1102, Shell Chemical Company
**VPE 5571
***Wingtack® 95 are prepared by blending in an extruder at about 375° F. and the blends extrusion coated on to kraft paper as described in Example I. The coated sheets are then tested employing the tests as described in Example I, the results of which are set forth in Table BB

TABLE BB

| Test | COMPOSITION | |
|---|---|---|
| | IV | Control |
| Adhesion to steel (oz./in.) | 15 | 14 |
| Tack | 0.2 | 0.3 |
| Solvent Resistance (secs.) | 330 | 900 |

EXAMPLE III

In further similar operations, the compositions set forth in Table C

TABLE C

| Components | COMPOSITION | |
|---|---|---|
| | IV | Control |
| | (parts by weight) | |
| S-I block copolymer* | 100 | 100 |
| Poly(ethylene terephthalate co-ethylene azelate)** | 40 | — |
| Polymerized piperylene isoprene solid tackifier*** | 80 | 80 |
| Zinc dibutyl dithiocarbamate | 2 | 2 |
| 2,5-Ditertiary-amylhydroquinone | 1 | 1 |

*Solprene® 311, Phillips Petroleum Company
**VPE 5571
***Wingtack® 95 are blended, coated and tested for adhesive and solvent resistance properties. The results are set forth in Table CC.

TABLE CC

| Test | COMPOSITION | |
|---|---|---|
| | V | Control |
| Adhesion to steel (oz./in.) | 120 | 115 |
| Tack | 0.2 | 2.5 |
| Solvent resistance | 250 | 900 |

EXAMPLE IV

In a further similar operation an adhesive of the following composition is prepared

| Components | Parts by Weight |
|---|---|
| S-I-S block copolymer* | 50 |
| S-I block copolymer** | 50 |
| Poly(butylene terephthalate co-butylene isophthalate)*** | 25 |
| Polymerized β-pinene tackifier resin**** | 50 |
| Zinc dibutyl dithiocarbamate | 2 |
| 2,5-Di-tertiary-amylhydroquinone | 1 |

*Kraton® 1107
**Solprene® 311
***A composition having a number average molecular weight of about 16,000, obtainable as VPE 4709 from Goodyear Tire & Rubber Co.
****Softening point 115° C. obtainable as Piccolyte® S-115, Hercules, Inc.

blending in an extruder at 375° F. and the composition coated onto kraft paper prepared as previously described. The coated sheets show good adhesive strength and solvent resistance.

What is claimed is:

1. A pressure-sensitive adhesive composition comprising a synthetic thermoplastic rubbery block copolymer, a non-rubbery polymer and a tackifier resin, wherein said rubbery block polymer is a copolymer of an alkenylarene A block and an aliphatic diene B block in which the alkenylarene is a polymer of styrene, a ring lower alkyl substituted styrene, a ring phenyl lower-alkyl substituted styrene, a ring (lower alkyl substituted) phenyl lower alkyl substituted styrene or a ring cyclohexyl substituted styrene and the aliphatic diene is a conjugated lower aliphatic diene of from 4 to 6 carbon atoms inclusive and said non-rubbery polymer is a copolyester, said copolyester being a polymer of at least two different ester units, each ester unit being a condensation product of a dicarboxylic acid and an alkylene diol of from 2 to 6 carbon atoms; and wherein for every 100 parts of rubbery block copolymer there is employed from about 5 to about 50 parts of the non-rubbery polymer and from about 20 to about 150 parts of tackifier resin.

2. A composition according to claim 1 wherein said block copolymer comprises an A-B-A block copolymer.

3. A composition according to claim 1 wherein said block copolymer comprises an A-B block copolymer.

4. A pressure-sensitive adhesive composition according to claim 1 comprising a thermoplastic rubber block copolymer of a polystyrene A block and an isoprene B block, a non-rubbery copolymer of a copolyester and a tackifier resin, said copolyester being a polymer of at least two different ester units, each ester unit being condensation product of a dicarboxylic acid and an alkylene diol of from 2 to 6 carbon atoms inclusive.

5. A composition according to claim 4 wherein the block copolymer comprises a styrene-isoprene-styrene block copolymer.

6. A composition according to claim 4 wherein the block copolymer comprises a styrene-isoprene block copolymer.

7. A composition according to claim 4 wherein the copolyester is a poly(ethylene terephthalate-co-ethylene azelate).

8. A composition according to claim 1 wherein the alkylene diol of the copolyester is an alkylene diol having from 2 to 4 carbon atoms.

9. A normally tacky and pressure-sensitive adhesive sheet which comprises a relatively thin flexible backing sheet and coated thereon, a pressure-sensitive adhesive composition, said composition comprising a rubbery block copolymer, from about 5 to 50 parts of a non-rubbery block copolymer for every 100 parts of the rubbery block copolymer and from about 20 to 150 parts of tackifier resins for every 100 parts of rubbery block copolymer, wherein said rubbery block copolymer is a copolymer of an alkenylarene A block and an aliphatic diene B block in which the alkenylarene is a polymer of styrene, a ring lower alkyl substituted styrene, a ring phenyl lower-alkyl substituted styrene, a ring (lower alkyl substituted) phenyl lower alkyl substituted styrene or a ring cyclohexyl substituted styrene and the aliphatic diene is a conjugated lower aliphatic diene of from 4 to 6 carbon atoms, and said non-rubbery polymer is a copolyester of at least two different ester units, each ester unit being a condensation product of a dicarboxylic acid and a alkylene diol of from 2 to 6 carbon atoms inclusive.

10. A method for imparting solvent resistance to pressure-sensitive adhesives of thermoplastic rubbery block copolymers which comprises incorporating from 5 to 50 parts of a copolyester for every 100 parts of block copolymer and 20 to 150 parts of tackifier resin; wherein said rubbery block copolymer is a copolymer of an alkenylarene A block and an aliphatic diene B block in which the alkenylarene is a polymer of styrene, a ring lower alkyl substituted styrene, a ring phenyl lower-alkyl substituted styrene, a ring (lower alkyl substituted) phenyl lower alkyl substituted styrene or a ring cyclohexyl substituted styrene and the aliphatic diene is a conjugated lower aliphatic diene of from 4 to 6 carbon atoms, and said copolyester is a polymer of at least two different ester units, each ester unit being a condensation product of a dicarboxylic acid and an alkylene diol of from 2 to 6 carbon atoms inclusive.

* * * * *